(12) United States Patent
Ellis et al.

(10) Patent No.: US 8,898,306 B2
(45) Date of Patent: *Nov. 25, 2014

(54) DYNAMIC APPLICATION PROVISIONING IN CLOUD COMPUTING ENVIRONMENTS

(75) Inventors: Richard Raymond Ellis, Hampshire (GB); Matthew William Leming, Romsey (GB); Timothy James Ward, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/431,978

(22) Filed: Mar. 28, 2012

(65) Prior Publication Data

US 2012/0185598 A1 Jul. 19, 2012

Related U.S. Application Data

(63) Continuation of application No. 13/215,089, filed on Aug. 22, 2011.

(30) Foreign Application Priority Data

Sep. 10, 2010 (EP) .................................... 10176178

(51) Int. Cl.
*G06F 15/173* (2006.01)
*G06F 9/50* (2006.01)
*H04L 12/24* (2006.01)

(52) U.S. Cl.
CPC ........... *G06F 9/5072* (2013.01); *H04L 41/0823* (2013.01); *H04L 41/0836* (2013.01); *H04L 41/083* (2013.01); *H04L 41/0826* (2013.01); *H04L 41/145* (2013.01)

USPC ............................ 709/226; 709/223; 709/224

(58) Field of Classification Search
CPC .............. H04L 41/0823; H04L 41/083; H04L 41/0826; H04L 41/0836; H04L 41/145
See application file for complete search history.

(56) References Cited

U.S. PATENT DOCUMENTS

| 2005/0102387 | A1* | 5/2005 | Herington | 709/223 |
| 2006/0059238 | A1* | 3/2006 | Slater et al. | 709/206 |
| 2008/0320138 | A1* | 12/2008 | Wada | 709/226 |
| 2009/0300609 | A1 | 12/2009 | Hicks et al. | |

(Continued)

OTHER PUBLICATIONS

Nallur, Vivek, et al., "Self-Optimizing Architecture for Ensuring Quality Attributes in the Cloud," In Proceedings of WICSA/ECSA, 2009, pp. 281-284.

(Continued)

*Primary Examiner* — Thomas Dailey
*Assistant Examiner* — Nam Tran
(74) *Attorney, Agent, or Firm* — Nelson and Nelson; Daniel P. Nelson; Alexis V. Nelson

(57) ABSTRACT

A method for dynamically provisioning a machine with applications to assist with work is a cloud computing environment is described. In one embodiment, such a method includes identifying a machine available for provisioning with at least one application. The method identifies work associated with a cloud computing environment. Responsive to identifying the work, the method determines how the machine can most optimally assist with the work. The method then dynamically provisions the machine with at least one application selected to enable the machine to most optimally assist with the work. A corresponding apparatus and computer program product are also disclosed.

11 Claims, 2 Drawing Sheets

(56) References Cited

U.S. PATENT DOCUMENTS

| | | |
|---|---|---|
| 2010/0049838 A1 | 2/2010 | DeHaan |
| 2010/0054156 A1 | 3/2010 | DeHaan |
| 2010/0306767 A1* | 12/2010 | Dehaan .................. 709/224 |
| 2011/0022870 A1* | 1/2011 | McGrane et al. ............ 713/340 |
| 2011/0110377 A1* | 5/2011 | Alkhatib et al. ......... 370/395.53 |

OTHER PUBLICATIONS

Boinc software, available at http://boinc.berkeley.edu/, last accessed on Aug. 2, 2011.

IBM WebSphere Virtual Enterprise, Version 6.1.0.3, Whitepaper, 2008.

* cited by examiner

DYNAMIC APPLICATION PROVISIONING IN CLOUD COMPUTING ENVIRONMENTS

BACKGROUND OF THE INVENTION

A "cloud" is a general term for a computing resource consisting of a large number of individual machines. These machines are typically physical, but may be logical machines in virtualized systems. Such machines typically use heterogeneous hardware and software, although some clouds are purely homogeneous.

In a heterogeneous cloud, there are, by definition, differences between the machines in the cloud. In hardware terms, this may mean that some machines in the cloud are better suited for certain types of work. For example, a mainframe may be best suited to I/O intensive work or large batch processing. In extreme cases, hardware differences may make it impossible to perform certain types of work. For example, a PowerPC machine may be unable to run code compiled for the x86 instruction set.

These differences also apply to the software stack installed on machines in the cloud. Sometimes, perhaps due to licensing restrictions or performance/storage limitations, not all machines in the cloud are capable of running the same applications. An example would be an Enterprise Java™ application. This type of application requires a JEE Application Server to be installed on the machine in the cloud. The application may have additional requirements (e.g., support for Session Initiation Protocol for Voice over IP) which may also need to be satisfied. Installing sufficient software to ensure that any application can run on any machine is likely to be prohibitive in terms of cost. It may also be impossible if the pieces of software have different incompatible dependencies. As a result, not every machine is likely to be able to run every application.

In a heterogeneous cloud, it is important to match the composition of the cloud to the workload being applied. This means that if a large number of Java applications need to run, then the cloud should contain a sufficient number of machines that can run Java applications. The cloud will consequently need fewer machines running Voice over IP (VoIP) routing software, since demand may be low. The problem with such a setup is that it requires either continuous, active management of the cloud, or a relatively inefficient static distribution of machine types. Both solutions are inefficient and costly. It may also be difficult to add new machines to the cloud, since it may require making an initial decision about how the machines are to be specialized.

In view of the foregoing, what are needed are apparatus and methods to dynamically provision machines with applications to enable them to more efficiently assist with work in a cloud computing environment.

SUMMARY

The invention has been developed in response to the present state of the art and, in particular, in response to the problems and needs in the art that have not yet been fully solved by currently available apparatus and methods. Accordingly, the invention has been developed to provide apparatus and methods to dynamically provision machines with applications so that they can most optimally assist with work in a cloud computing environment. The features and advantages of the invention will become more fully apparent from the following description and appended claims, or may be learned by practice of the invention as set forth hereinafter.

Consistent with the foregoing, a method for dynamically provisioning a machine with applications to assist with work associated with a cloud computing environment is disclosed herein. In one embodiment, such a method includes identifying a machine available for provisioning with at least one application. The method identifies work associated with a cloud computing environment. Responsive to identifying the work, the method determines how the machine can most optimally assist with the work. The method then dynamically provisions the machine with at least one application selected to enable the machine to most optimally assist with the work. A corresponding apparatus and computer program product are also disclosed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
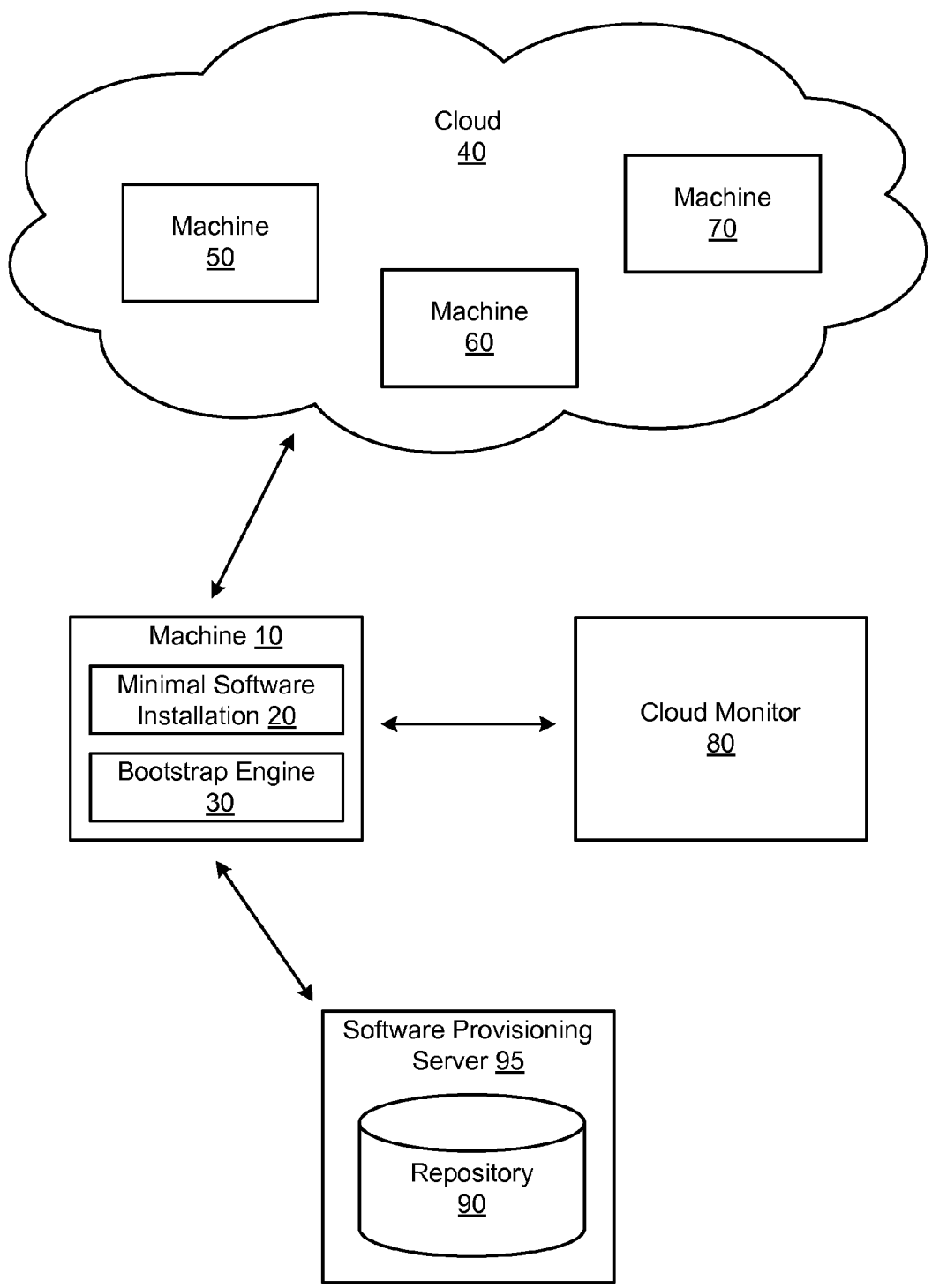
FIG. 1 is a high-level block diagram showing various components that may be included in an embodiment of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, various aspects of the invention may be embodied as an apparatus, system, method, or computer program product. Furthermore, various aspects of the invention may take the form of a hardware embodiment, a software embodiment (including firmware, resident software, micro-code, etc.) configured to operate hardware, or an embodiment combining software and hardware that may all generally be referred to herein as a "module" or "system." Furthermore, various aspects of the invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for carrying out operations of the invention may also be written in a low-level programming language such as assembly language.

The present invention may be described below with reference to flowchart illustrations and/or block diagrams of methods, apparatus, systems, and computer program products according to various embodiments of the invention. It will be understood that each block of the flowchart illustrations and/or block diagrams, and combinations of blocks in the flowchart illustrations and/or block diagrams, may be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, a mechanism is disclosed by which portions of each specially-provisioned machine within a pool of machines (e.g., a cloud) can be automatically and dynamically controlled. Various components of an embodiment of the invention are shown in FIG. 1. This Figure is intended be read in conjunction with FIG. 2, which shows a process in accordance with the invention. FIG. 1 shows a machine 10 that is available to be added to a pool of resources denoted by cloud 40. The cloud 40 includes a number of machines 50, 60, 70 that are essentially servers or other devices performing work for a number of requesting clients (not shown).

When a machine 10 is initialized at step 100 (for example, when a machine 10 is first identified as being available to assist in performing work of the cloud 40), the machine 10 may be in a generic state. This means that the machine 10 has only a minimal software installation 20 and is not specially configured for any given task. A minimal installation 20 may include a basic networking stack and bootstrap engine 30 which will be discussed in more detail below. The bootstrap engine 30 may be retrieved from a repository 90 upon startup, in which case the machine 10 may need configuration information for locating a software provisioning server 95 (e.g., server 95). Alternatively such configuration information could be contained within the bootstrap engine 30.

The machine 10 may use the bootstrap engine 30 to query its environment for important information. This may involve querying the cloud 40 directly, in which case a subset of the machines in the cloud 40 may be queried. Alternatively, the machine 10 may query a cloud monitor 80. The cloud monitor 80 may monitor either the complete cloud 40 or some subset of machines within the cloud 40 and maintain appropriate statistics. It will be appreciated that the cloud monitor 80 is optional since the machine 10 may also query the cloud 40 for needed information.

Among other information, the machine 10 may query 110 the environment (e.g., the cloud 40 and/or cloud monitor 80) for information about the current makeup of the cloud—i.e. what proportion of machines are specially configured to perform particular tasks. For example, certain machines may be performing vector processing, others database work, while others are idle. In certain embodiments, the specialization of a machine is determined from the applications running thereon. Thus a machine that is performing database work may have a database manager or other database application running or installed thereon.

The machine 10 may also query 120 the environment to determine the cloud's current workload. This may be determined by analyzing a number of metrics, such as the utilization of various machines in the cloud 40 and the queue of work to be serviced by the cloud 40. For example, the cloud monitor 80 may determine that three of the machines in the cloud 40 are performing vector processing and are about eighty percent utilized. The cloud monitor 80 may further determine that work queued on the cloud 40 includes a large amount of vector processing work that is likely to overload the three machines. In certain embodiments, the cloud monitor 80 assigns weights to machines in a given specialization by their capacity to service work.

In addition to discovering information about the cloud 40, a machine 10 may also be configured to discover 130 its own capabilities. Useful information may include the amount of RAM, hard-disk size, processor speed, graphics capabilities, and the like. Such information may be useful to determine the specialization or potential specialization of the machine 10. For example, a machine 10 that is good at vector processing may have a high processor speed or a specialized vector processing engine.

It will be appreciated that part of most basic operating systems is the ability to query the host machine's hardware. This raw data may be available through the BIOS and using low-level machine queries. Software to perform these queries may be either part of the basic initial kernel installation, or downloaded from a repository 90.

The machine 10 may also determine 140 what specialized software stacks are available to be deployed on the machine 10. This may include querying the repository 90 to determine what individual applications are available or what software images are available. Such information may alternatively be discovered from metadata associated with the cloud 40. In certain embodiments, such information is queried when a machine starts up.

The information gathered at steps 110, 120, 130, 140 may be used by the machine 10 to determine an appropriate machine specialization at step 150.

In certain embodiments, the bootstrap engine 30 has access to metadata describing the applications or combinations of applications that are available (software stack specializations). Such information may indicate the purpose of an application or set of applications. Each application or set of applications may have associated therewith system/software requirements that need to be satisfied before such applications or application sets can be installed. For example, application x may require 4 GB of RAM and a 1 TB hard disk before it can be installed. Application x may also require that applications y and z be installed before application x is installed. For example, certain applications such as infrastructure (middleware) applications (e.g., a Java EE Application server) may need to be installed before a customer application can be installed and executed. In certain embodiments, this information is gathered at step 140.

The information gathered at steps 110, 120, 130, 140 may be used by the bootstrap engine 30 to determine how the machine 10 can be optimally used within the cloud 40. In certain embodiments, the information gathered is used to produce a set of weights associated with each potential specialization. The weights may be calculated in such a way as to balance one or more of the following factors:

First, the weights may be calculated to take into account how suitable a machine is for performing a certain type of work. If a particular machine cannot install a particular software application or software stack, the weight may be zero. The weight may also take into account the capacity of the machine for particular types of work—a higher weight may indicate that the machine is better at performing certain types of work.

Second, the weights may be calculated to take into account the current workload of the cloud. This allows a machine 10 to configure itself in a manner that it can relieve highly loaded systems, thereby allowing it to address demands on the cloud 40.

Third, the weights may be calculated to take into account the current organization of the cloud. Thus, a machine 10 may configure itself to adjust the capacity of the cloud 40 to best match the workload of the cloud 40. Even if there is a large queue of one type of work, the machine 10 may add capacity/redundancy in another area to maintain a Quality of Service (QoS) with another type of work. For example, a large queue of batch work may be less important than ensuring sufficient capacity for IP telephony. Thus the bootstrap engine 30 may consider factors such as the QoS of certain types of work.

The weights discussed above may reflect how good a machine 10 is at performing particular work and how this capability can be used to contribute to performing the workload of the cloud 40. For example, it may be determined that a machine 10 is good at database work but equally good at performing vector processing. If there are ten machines already processing database work and the cloud is not overly loaded with database work, but is reaching capacity with regard to vector processing, the new machine 10 may be configured to perform vector processing. Thus an appropriate specialization may be determined and selected at step 150. This selection may be made using the highest weight option or probabilistically based on a weighted distribution.

Once a specialization has been selected, the machine 10 may configure itself by installing the relevant application(s) or set of applications (e.g. one set of various possible pre-constituted software stacks), as shown at step 160. This may be achieved using software in the repository 90. The machine 10 then joins 170 the cloud 40 as an active member specialized for a particular task (or tasks) and processing ends. Once the machine 10 has joined the cloud 40, the machine 10 is ready to receive and perform work for the cloud 40.

In certain embodiments, machine "down-time," which refers to the time that software is being installed and the machine 10 is unavailable, may be taken into account. In certain embodiments, this can be achieved by associating a degree of negative weighting with any potential change to the set of currently installed applications.

The solution described above and illustrated in FIGS. 1 and 2 has various advantages. First, it may allow the cloud 40 to evolve and reconfigure itself in a manner that matches the current workload, with little if any manual intervention. This decreases management overhead on the cloud 40, making administration easier and cheaper. The overhead of adding new machines to the cloud 40, or recovering a set of machines after a crash, is also very low. The cloud 40 will automatically rebalance itself to best utilize the machines in the cloud 40.

Second, machines in the cloud 40 will typically end up performing tasks for which they are optimally suited. An ideal cloud 40 will contain a large number of identical machines, although in practice this can be difficult to achieve. Over time newer, faster machines will be added, potentially using different architectures. Also, existing hardware may be utilized in a more optimal manner by adding it to a cloud 40. The "evolution" of the cloud 40 as described herein allows for better utilization of systems, resulting in more efficient use of computational resources.

Third, the machines in the cloud 40 may become more highly specialized. By creating a set of software stacks, machines in the cloud 40 may be assigned a small set of specialized functions. This may significantly reduce the storage required on each machine and may reduce licensing costs by only installing applications on machines on which they are needed.

If, for some reason, any piece of information gathered at steps 110, 120, 130, 140 is not available, then an appropriate specialization may be calculated using any subset of the available information. For example, if the current makeup or workload of the cloud 40 is unable to be determined, a machine may be configured to perform work for which it is optimally suited.

Additionally, it should be noted that the specialization process does not have to be a one-time process. If a machine detects that its utilization is low, or there is a significant queue of a different type of work for which the machine is not currently specialized to handle, the machine could elect to reconfigure itself with a different specialization. In yet other embodiments, a machine 10 may not completely reconfigure itself. In other words, the machine 10 may not strip itself back to its generic minimal installation 20 but may instead simply uninstall certain applications and install others in their place.

In certain embodiments, the reconfiguration may be initiated by a central management agent (e.g., the cloud monitor 80). In yet other embodiments, the reconfiguration may be triggered by an administrator such as by rebooting a machine within the cloud 40. A machine that is being reconfigured could be removed from the cloud 400 until the process is complete, although this is not essential. In certain embodiments, the load experienced by machines in the cloud 40 is monitored to allow the machines to power down if utilization is low.

Figure 2:
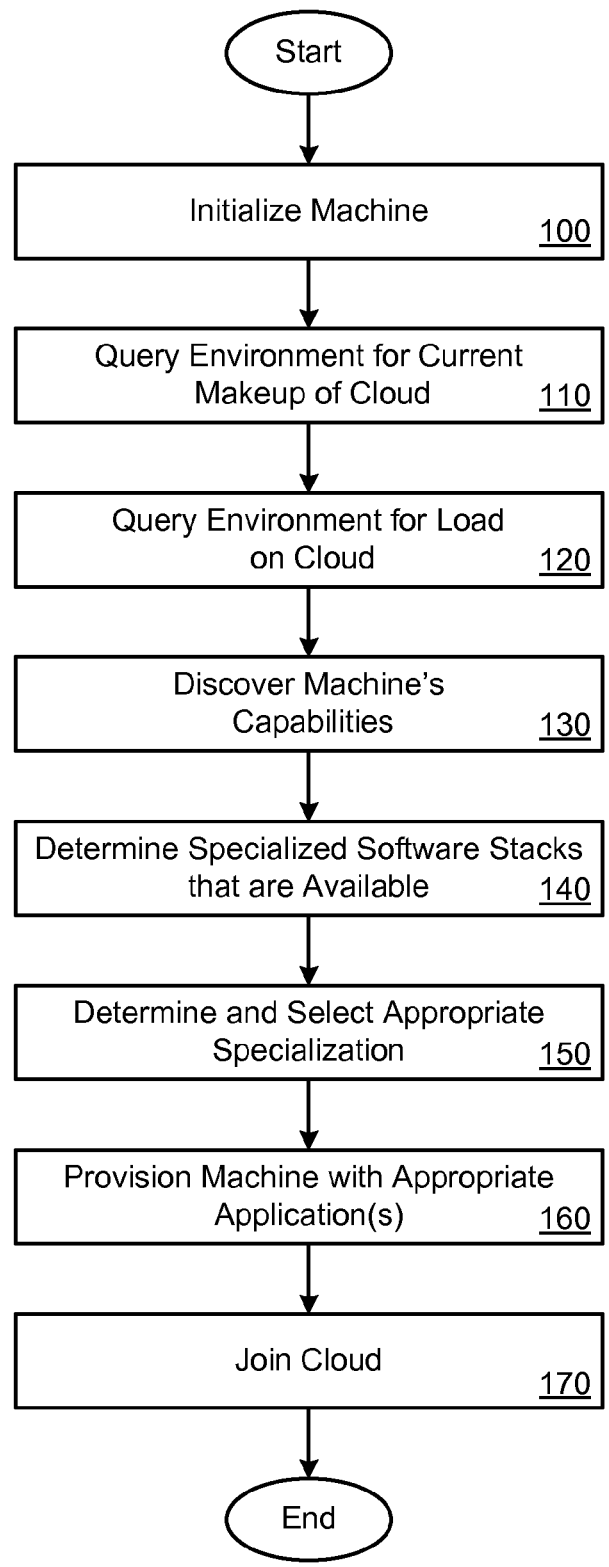
FIG. 2 is a flow chart showing one embodiment of a process in accordance with the invention.

It should be noted that while the machine 10 has been described as performing many of the steps described in FIG. 2 (e.g., steps 110 through 160), some or all of the steps could be performed by a separate agent or agents.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for dynamically provisioning a machine to more optimally assist with a workload of a cloud computing environment comprising one or more machines, the method comprising:
   initializing a machine for use in a cloud computing environment;
   identifying a workload associated with the cloud computing environment;
   identifying capabilities of the machine with regard to assisting with the workload;
   identifying applications for potential installation on the machine to assist with the workload;
   based on the workload, capabilities, and applications, determining a plurality of potential specializations for the machine in assisting with the workload, each specialization having a weight value indicating the specialization's effectiveness in assisting with the workload, the weight value taking into account "down-time" needed to reconfigure the machine for another specialization;
   dynamically configuring the machine with applications associated with the specialization having the largest weight value; and
   joining the machine to the cloud computing environment.

2. The method of claim 1, wherein identifying the workload comprises identifying a type of work being performed by at least one machine in the cloud computing environment.

3. The method of claim 1, wherein identifying the workload comprises identifying a type of work queued on at least one machine in the cloud computing environment.

4. The method of claim 1, wherein identifying the workload comprises at least one of:
   determining a load associated with at least one machine performing a particular type of work in the cloud computing environment; and
   determining an average load across a plurality of machines in the cloud computing environment.

5. The method of claim 1, wherein identifying the workload comprises identifying a current workload associated with the cloud computing environment.

6. The method of claim 1, further comprising automatically recalculating each weight value as the workload of the cloud computing environment changes.

7. The method of claim 6, further comprising dynamically configuring the machine with applications associated with the specialization having the largest recalculated weight value.

8. The method of claim 1, further comprising querying the cloud computing environment for information about a current makeup of the cloud computing environment.

9. The method of claim 8, wherein determining the plurality of specializations comprises determining the plurality of specializations based on the current makeup of the cloud computing environment.

10. The method of claim 8, wherein querying the cloud computing environment comprises querying a component responsible for monitoring the cloud computing environment.

11. The method of claim 1, wherein initializing a machine comprises initializing an existing machine in the cloud computing environment.

* * * * *